United States Patent [19]
Grube et al.

[11] Patent Number: 5,678,197
[45] Date of Patent: Oct. 14, 1997

[54] METHOD FOR REPROGRAMMING A COMMUNICATION UNIT'S ACCESS TO A WIRELESS COMMUNICATION SYSTEM

[75] Inventors: Gary W. Grube, Palatine; Timothy W. Markison, Hoffman Estates; Thomas E. Weston, Marengo, all of Ill.

[73] Assignee: Motorola, Inc., Schaumburg, Ill.

[21] Appl. No.: 551,979

[22] Filed: Nov. 2, 1995

Related U.S. Application Data

[63] Continuation of Ser. No. 144,600, Oct. 28, 1993, abandoned, which is a continuation-in-part of Ser. No. 23,292, Feb. 26, 1993.

[51] Int. Cl.[6] .................................................. H04Q 7/20
[52] U.S. Cl. .......................... 455/54.2; 455/33.1; 379/59
[58] Field of Search ............................ 455/33.1, 38.1, 455/54.1, 54.2, 56.1, 186.1; 340/825.44, 311.1; 379/62, 63, 59

[56] References Cited

U.S. PATENT DOCUMENTS

| | | | |
|---|---|---|---|
| 4,910,510 | 3/1990 | Davis et al. | 455/38.1 X |
| 5,012,234 | 4/1991 | Pulaney et al. | 340/825.44 |
| 5,077,828 | 12/1991 | Waldroup | 455/186.1 |
| 5,247,619 | 9/1993 | Snowden et al. | 370/94.1 |
| 5,297,192 | 3/1994 | Gerszberg | 379/63 |
| 5,301,232 | 4/1994 | Mulford | 380/21 |
| 5,379,343 | 1/1995 | Grube et al. | 380/2.5 |
| 5,483,465 | 1/1996 | Grube et al. | 455/54.1 |
| 5,581,802 | 12/1996 | Erickson et al. | 455/54.2 |

FOREIGN PATENT DOCUMENTS

| | | | |
|---|---|---|---|
| 3441724 | 5/1986 | Germany | 379/59 |

*Primary Examiner*—Edward F. Urban
*Attorney, Agent, or Firm*—Christopher P. Moreno

[57] ABSTRACT

A monitoring computer (115) monitors a communication resource within a wireless communication system for transmissions by a communication unit. Upon detecting the transmission, which contains a service request, the monitoring computer compares the service request with stored service access information for the communication unit. When the service request made by the communication unit does not substantially match the stored service access information, the monitoring computer reprograms at least a portion of the service access information of the communication unit. In this manner, discrepancies in communication unit programming may be corrected. In another embodiment, service access information is transmitted to the monitoring computer for comparison.

2 Claims, 3 Drawing Sheets

| 201 | 202 | 203 | 204 | 205 |
|---|---|---|---|---|
| UNIT ID CODE | FEATURES | APPLICATIONS AND SERIAL NUMBERS | LOCATION AND TIME AND COUNT | GROUP ID CODE |
| 1 | 3,7,5 | 10-3763 | 22/18:10/3 | 201 |
| 2 | 1,3,8 | 9-4509756 | 15/18:20/5 | 201 |
| 3 | 3,4,5 | 49-46383 | 6/14:00/2 | 300 |
| ⋮ | | | | |

| 206 | 207 | 208 | 209 |
|---|---|---|---|
| GROUP ID CODE | FEATURES | APPLICATIONS AND SERIAL NUMBERS | COPIES |
| 201 | 1,3,5,7,8 | 10-3763 | 1 |
| | | 9-4509756 | 1 |
| 202 | 11 | 30-29463 | 2 |
| 300 | 3,4,5,10 | 49-46383 | 10 |
| ⋮ | | | |

METHOD FOR REPROGRAMMING A COMMUNICATION UNIT'S ACCESS TO A WIRELESS COMMUNICATION SYSTEM

This is a continuation of application Ser. No. 08/144,600, filed Oct. 28, 1993 and now abandoned, which is a continuation in part of co-pending application having a serial number of Ser. No. 08/023,292, filing date Feb. 26, 1993, entitled "Detection Of Unauthorized Use Of Software Applications In A Communication Unit".

FIELD OF THE INVENTION

The present invention relates generally to communication systems and, in particular, to a method for reprogramming a communication unit's access privileges to a wireless communication system.

BACKGROUND OF THE INVENTION

The basic operation and structure of land mobile radio communication systems and cellular radio/telephone communication systems (communication systems) are known. Communication systems typically comprise a plurality of communication units (vehicle mounted or portable radios in a land mobile system and radio/telephones in a cellular system), a predetermined number of repeaters, located throughout a geographic region, that transceive information via communication channels, and a controlling entity. The controlling entity may either be a centralized call processing controller or a network of distributed controllers working together to establish communication paths for the communication units.

In the course of normal operations, communication units can often utilize various communication services or features to communicate with one another. For instance, a communication unit may be capable of group dispatch, private call, secure voice, telephone interconnect and other services (as found in a Motorola SmartNet™ or Privacy Plus™ communication system), or a subset of such services. The provision of multiple communication services typically adds value to those communication units capable of such services. This added value is often reflected by communication system manufacturers as an added premium to the cost of the communication units. For example, a customer may purchase a Privacy Plus™ system and pay an extra fee to allow a certain group of mobiles to have additional telephone interconnect capabilities. Quite often, the distinguishing characteristics between a "regular" mobile and an "enhanced" mobile are the software applications operating within each communication unit.

Typically, there are two techniques which allow the selective utilization of software applications by a communication unit. In the first technique, each communication unit is programmed at the manufacturer's factory with software applications stored in a non-volatile memory such as PROM (programmable read-only memory). Regular and enhanced communication units are distinguished by codeplug bits which enable various software applications. Thus, the non-volatile memories of both a regular and enhanced communication unit contain the same software, but those applications necessary for additional types of communication are enabled (via the codeplug bits) only in enhanced communication units. Alternatively, an external programming device may be used to enable software applications. For instance, many communication products made by Motorola utilize Radio Service Software (RSS), which operate on a typical personal computer, to enable various software features.

A second technique for selective software utilization is to add software applications via an external programming device similar to RSS. For this technique, individual communication units contain a re-programmable non-volatile memory such as EEPROM (electrically erasable programmable read-only memory) for storing the software applications. Thus, the memory of a regular communication unit will contain only those software applications necessary for basic operation whereas the memory of an enhanced communication unit will contain additional software applications. Unfortunately, neither of the two techniques discussed above are able to fully prevent unauthorized use of software applications.

It is possible for a user to copy the non-volatile memory of an enhanced communication unit and place the replicated software applications into the non-volatile memory of a regular unit, thereby creating a substantially identical enhanced unit without paying an additional fee. Such tactics are often employed in systems where a user is charged according to the number of communication unit identification codes (unit ID codes) used in the system. By duplicating a communication unit's memory, and hence its ID code, additional communication units can be provided. Alternatively, anyone in possession of the appropriate external programming device can illicitly enable unauthorized software applications. Although many communication systems possess means for denying access to communication units that are incorrectly programmed, some system operators do not enable these means, thus allowing unauthorized use. Furthermore, while many communication systems possess means for denying access to communication units that are incorrectly programmed, they are not capable of detecting the extent of the incorrect programming nor are they capable of correcting the incorrect programming. The unauthorized use and duplication of software applications and unit ID codes not only cheat manufacturers of their entitled fees, they also overburden critically scarce communication resources and interfere with the authorized communications of other communication units.

Therefore a need exists for a method which allows the detection of unauthorized use of duplicated software applications and allows such unauthorized duplications to be correctly reprogrammed.

DESCRIPTION OF A PREFERRED EMBODIMENT

Generally, the present invention provides a method for reprogramming communication units in a wireless communication system that have been identified as unauthorized users of software applications. This is accomplished by associating a monitoring computer with the communication system to monitor communication resources within the communication system. While monitoring communication resources, the monitoring computer compares those services requested by various communication units with a database of stored service access information, thus detecting illicit use and/or duplication. Once unauthorized use or duplication has been detected, the monitoring computer transmits a command to reprogram the communication unit's service access information in accordance with the stored information. With such a method, unauthorized use or duplication of software applications within a wireless communication system can be readily corrected, thus freeing up valuable communication resources for authorized users.

Figure 1:
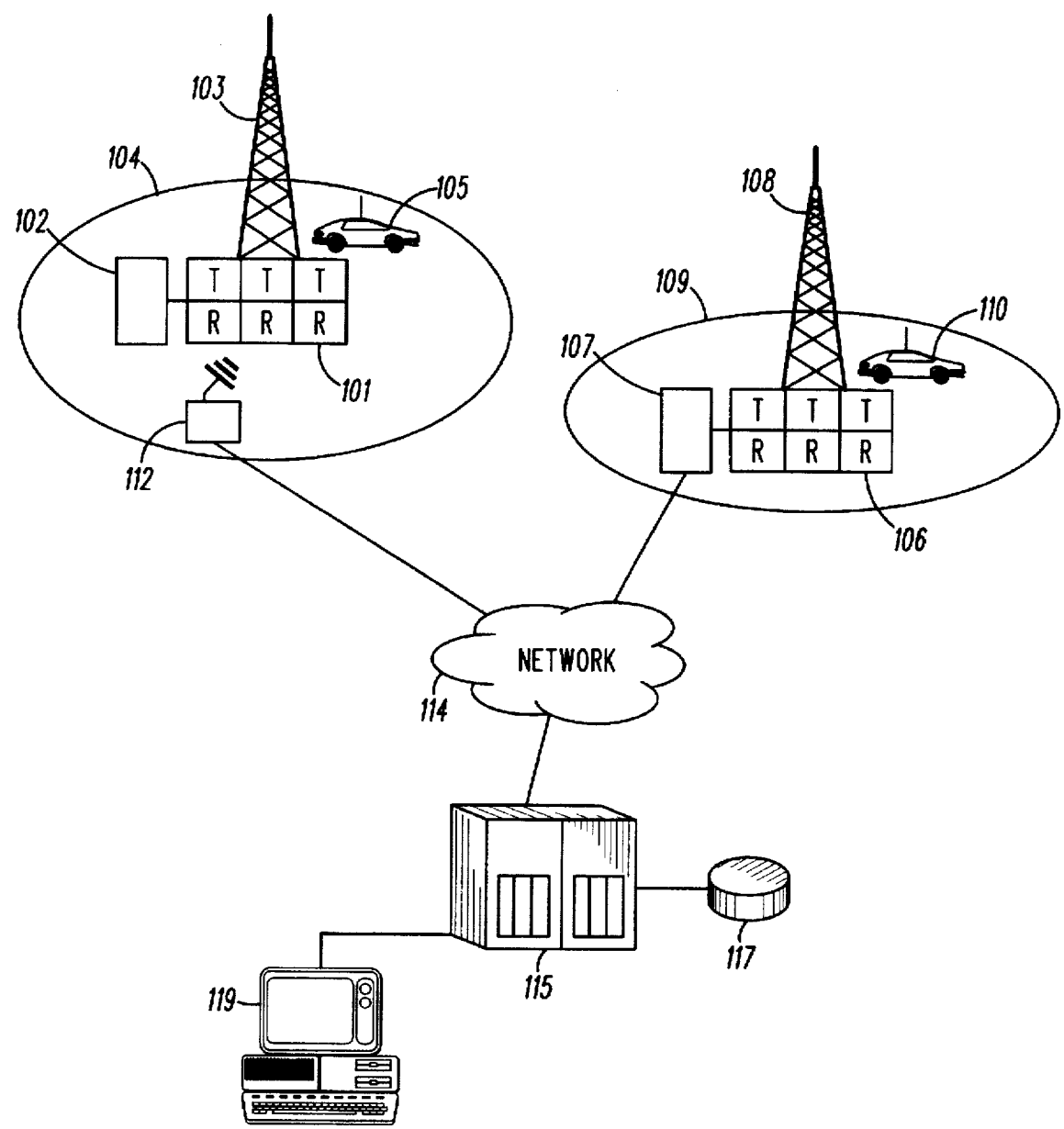
FIG. 1 illustrates a multi-site communication system, equipped with a monitoring computer, in accordance with the present invention.

The present invention can be more fully described with reference to FIGS. 1–4. FIG. 1 illustrates multiple communication systems (104, 109) operably connected to a monitoring computer (115). Each communication system (104, 109) comprises a plurality of communication units (105, 110), a predetermined number of base stations (101, 106) operably connected to fixed antenna systems (103, 108), and a call processing controller (102, 107). The call processing controller (102, 107), which may be a Motorola Smartzone Zone Controller, transmits and receives, via the base stations (101, 106), control information to establish communications between two or more communication units.

The monitoring computer (115), connected to a database (117) and a computer terminal (119), is operably coupled to the communication systems (104, 109) via a network (114). The monitoring computer (115), database (117), and computer terminal (119) may comprise a commercially available mid-range computing device, such as an IBM AS400. As shown, there are at least two ways to couple the monitoring computer (115) to the communication systems (104, 109). First, a communication system (104) may be connected to the network (114) by way of an over-the-air radio modem (112), which in turn communicates with the call processing controller (102) over at least one channel in the group of base stations (101). Alternatively, the network (114) connection can be established directly to the call processing controller (107).

In either case, the coupling allows the monitoring computer (115) to extract relevant control information regarding the communication systems (104, 109) from the network protocol and to access communication resources when needed to reprogram a communication unit (discussed in detail below). The manner in which the monitoring computer (115) is coupled to the network (114) as well as the manner in which control information is routed to the monitoring computer (115) is dependent upon the actual computing device used to implement the monitoring computer (115) and the network protocol. For example, if the network (114) is a public telephone switching network (PTSN), the monitoring computer (115) would need a modem as would the call processing controller (107).

Figures 2, 3:
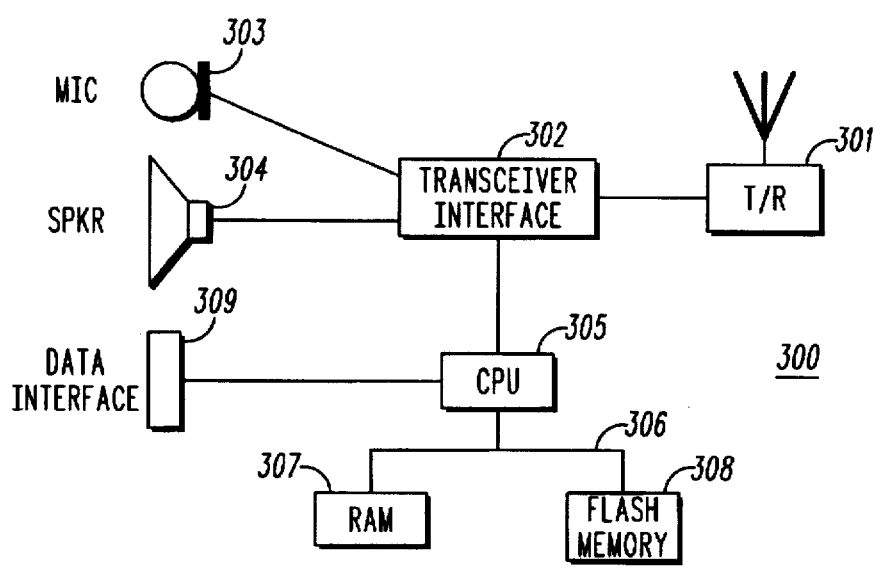
FIG. 2 illustrates a database format which may be used by the monitoring computer in accordance with the present invention.
FIG. 3 illustrates a block diagram of a communication unit in accordance with the present invention.

FIG. 2 illustrates tables of the database (117) that contain, for each communication unit being monitored, stored service access information. In the first table, a unit ID code field (201) represents the identities of the communication units. Communication units are normally assigned a unique identity code to differentiate them from other communication units. Associated with each unit ID code are several other fields used to determine valid software parameters. The features field (202) lists which of the possible imbedded service features this unit is allowed to request and use. An applications and serial numbers field (203) lists the software applications each communication unit is authorized to possess and use. The applications, each uniquely identified by an authorized serial number, allow the communication units to access the features shown in the features field (202). A location, time, and count field (204) is used to temporarily store location identities and time indications of system accesses by the communication units. The count entry within the location, time, and count field (204) is used by the monitoring computer (115) to track the number of accesses to the network (114) by each communication unit. Finally, a group ID code field (205) associates an individual unit ID code to a group.

The combination of the table fields (201–204) provides stored service access information. For example, the communication unit identified by unit ID code 3 and affiliated with group ID number 300 is allowed to use, by virtue of possessing the software application having serial number 49-46383, features 3, 4, and 5. Furthermore, it can be seen that communication unit 3 last accessed the system, for the second time, at 1400 hours (2 PM standard time) while located within site 6.

Similarly, a second table associates group identities with their authorized features and applications. A group ID code field (206) represents the identity of a group of communication units. Groups of communication units are normally associated with a unique group identity code to differentiate them from other groups of communication units. Associated with each group ID code are several other fields used to determine valid software parameters. The features field (207) lists which of the possible imbedded service features units of this group are allowed to request and use. An applications and serial numbers field (208) lists the software applications each communication unit within the group is authorized to possess and use. The applications, which are uniquely identified by an authorized serial number, allow each communication unit within the group to access the features shown in the features field (207). A copies field (209) identifies how many total copies of a particular application that the members of a group ID code are authorized to possess and use. For example, communication units affiliated with the group ID code 202 are allowed to use feature 11 only and are further authorized to use no more than 2 copies (as a group) of the requisite software application uniquely identified with serial number 30-29463.

FIG. 3 illustrates a block diagram of a communication unit (300) that includes a transceiver (301) operably coupled to the remainder of the communication unit (300) via a transceiver interface (302). The remainder of the communication unit (300) includes a microphone (303), a speaker (304), a central processing unit (CPU) (305), volatile memory (307), programmable non-volatile memory (308), and a data interface (309). Note that the transceiver (301) transmits and receives information using communication resources such as TDM (time-division multiplexed) slots, carrier frequencies, a pair of carrier frequencies or any other radio frequency (RF) transmission media.

The microphone (303) and speaker (304) provide inputs and outputs, respectively, for routine voice communications between users of two or more communication units. The CPU (305), which may comprise a Motorola 68HC11 microprocessor, provides control of the communication unit (300) and also provides direct communication to other external computing devices by way of the data interface (309), which may be an EIA standard port such as RS-232, RS-422, or another type. As indicated, the volatile memory (307) may be random-access memory (RAM) whereas the programmable non-volatile memory (308) can be a flash memory such as EEPROM. In a preferred embodiment, software applications used by the communication unit (300) are stored in the programmable non-volatile memory (308).

In operation, a user of the communication unit (300) may request a particular system service by initiating the appropriate function on the communication unit (300) (for example, a push to talk function that prepares a request for a channel access message). Once initiated, the communication unit (300) transmits, via a control channel, the request to a call processing controller (102, 107). Similarly, the call processing controller (102, 107) can transmit control information to the communication unit (300) via the control channel. In a preferred embodiment, the monitoring computer (115) monitors the control channel to determine authorized use of the communication unit (300) as discussed with reference to FIG. 4.

Figure 4:
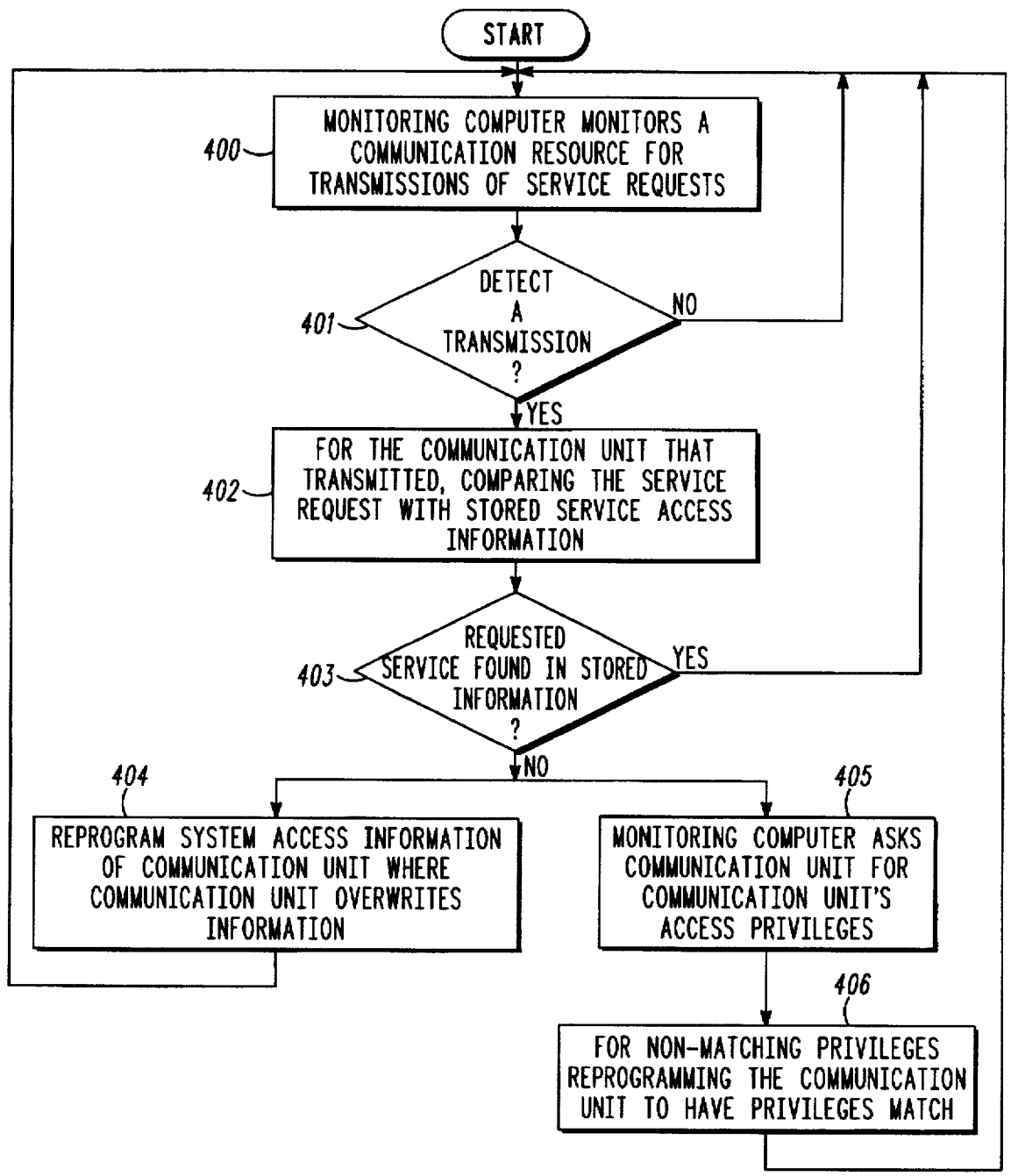
FIG. 4 illustrates a logic diagram that may be used to implement the present invention.

FIG. 4 illustrates a logic diagram that the monitoring computer (115) may incorporate to implement the present invention. At step 400, the monitoring computer (115) monitors a communication resource of a communication system for communication units' transmissions. As mentioned above, when a communication unit transmits a request for service (such as a request for channel access) the request contains the unit's ID and a service request message. The service request message typically contains a request for one of the following services: group dispatch call, private call, telephone interconnect, data call, or another type of service offered by the communication system.

When a transmission is detected (401), the monitoring computer compares (402) the transmitted service request and communication unit ID with stored service access information. (The stored access information was discussed previously with reference to FIG. 2 and is stored in the database 117.) If the transmitted service request matches a service request of the stored service access information for this particular communication unit (403), no action is taken by the monitoring computer. For example, referring to FIG. 2 assume that the monitoring computer detected a transmission from a communication unit having a unit ID of 3 and the requested service was feature 4. When the monitoring computer checks the database, it will find that this communication unit is authorized to access this service and no action will be taken. (Note that the same process applies if the group ID is used in place of the unit ID.)

If, however, the requested service does not match an entry of the stored service access information (403), the monitoring computer (115) reprograms the service access information of the communication unit. In order to reprogram the communication unit, the monitoring computer (115) must request and receive a channel grant. Once the monitoring computer (115) has a channel, the communication unit may be reprogrammed in a variety of ways. For example, the communication unit may be reprogrammed to overwrite (404) at least a portion of its service access information with reprogramming information. The reprogramming information may be a correct list of system access privileges, instructions to disable the communication unit, a set of default services, instructions to re-affiliate the communication unit/group with a default communication group in the same system, or instructions to re-affiliate the communication unit/group with a default communication system.

As an alternate reprogramming example, the monitoring computer (115) may transmit a request to the communication unit asking it for its access privileges (405). Upon receiving the request, the communication unit transmits, via the channel allocated to the monitoring computer, its access privileges. After receiving the unit's access privileges, the monitoring computer compares the received list of privileges with the stored service access information. In the event that a mismatch occurs, the monitoring computer reprograms (406) the access privileges of the communication unit to match the stored service access information. This can be done by replacing all of the access information stored in the communication unit or only those portions that did not match the stored service access information in the monitoring computer's database.

The present invention provides a method for reprogramming communication units when they have unauthorized system access privileges. With such a method, communication units that obtained valid unit IDs and valid system access privileges through illicit means can be detected and reprogrammed. Such units may be reprogrammed to have the system access privileges that are authorized for the unit, the unit may be disabled, or re-assigned to a default group or system. Prior art communication unit software and hardware protection methods and means does not address the problem of valid unit IDs and valid system access privileges being placed in unauthorized communication units. Specifically, RSS limits service access to valid ID's and software applications, however, RSS does not determine how the communication units received the system access privileges.

We claim:

1. A method for reprogramming a communication unit's access privileges to a wireless communication system, the method comprising the steps of:

a) monitoring, by a monitoring computer, a communication resource of the wireless communication system to detect a transmission by a communication unit, wherein the transmission includes a service request;

b) upon detecting the transmission, comparing, by the monitoring computer, the service request to stored service access information for the communication unit;

c) when the service request is requesting a service not contained in the stored service access information, transmitting, by the monitoring computer, a request for the communication unit's access privileges;

d) upon receipt of the request, transmitting, by the communication unit, the communication unit's access privileges to the monitoring computer;

e) upon receipt of the communication unit's access privileges, comparing, by the monitoring computer, the communication unit's access privileges with the stored service access information; and f) when the communication unit's access privileges do not substantially match the stored service access information, reprogramming, by the monitoring computer, at least a portion of the communication unit's access privileges such that the communication unit's access privileges substantially match the stored service access information.

2. A method for a communication unit to have access privileges to a wireless communication system be reprogrammed, the method comprising the steps of:

a) transmitting a service request over a communication resource of the wireless communication system;

b) receiving a request for an indication of service access privileges over another communication resource of the wireless communication system;

c) transmitting the service access privileges;

d) receiving reprogramming information; and e) overwriting the service access privileges with the reprogramming information, wherein the communication unit is prohibited from future transmissions of the service request.

* * * * *